United States Patent Office 3,814,706
Patented June 4, 1974

3,814,706
SILICONE RESINS USED AS SURFACTANTS IN VINYL CHLORIDE FOAM
Edward T. Simoneau, Burnt Hills, Richard E. Moeller, Troy, and Norman G. Holdstock, Scotia, N.Y., assignors to General Electric Company, Waterford N.Y.
No Drawing. Application Nov. 10, 1970, Ser. No. 88,472, now Patent No. 3,730,931, which is a continuation-in-part of abandoned application Ser. No. 53,973, July 10, 1970. Divided and this application Mar. 1, 1973, Ser. No. 337,070
Int. Cl. C08f 29/34, 47/08
U.S. Cl. 260—2.5 P          17 Claims

ABSTRACT OF THE DISCLOSURE

A composition comprising a vinyl chloride polymer, a plasticizer and a silicone resin selected from a silicone resin having $R_3SiO_{1/2}$ monofunctional units and $SiO_2$ tetrafunctional units with the ratio of the monofunctional units to the tetrafunctional units being from 0.25 to 0.75 with 3.0 to 5.0% by weight of hydroxyl groups and a silicone resin having $R'_3SiO_{1/2}$ monofunctional units and $SiO_2$ tetrafunctional units and $R^2{}_2SiO$ difunctional units with the ratio of monofunctional units to tetrafunctional units to difunctional units being from 0.25–0.75 to 1 to 0.05–0.1 with 3.0 to 5.0% by weight of hydroxyl groups and wherein R, R', $R^2$ are monofunctional hydrocarbon radicals. The composition is mechanically frothed with air to produce a foam which is then heated to gel and fuse the foam. There is preferably used in the above composition one of the above silicone resins which has been further treated so that it has less than about 0.5% by weight of hydroxyl groups. In addition, there is provided a very efficient foaming agent which is produced by adding one of the above silicone resins with a select class of plasticizers, such as dioctyl phthalate.

BACKGROUND OF THE INVENTION

This application is a division of copending application Ser. No. 88,472, filed Nov. 10, 1970, now U.S. Pat. No. 3,730,931, which in turn is a continuation-in-part of parent application Ser. No. 53,973, filed July 10, 1970, and now abandoned.

The present invention relates to vinyl chloride plastisol compositions which can be mechanically frothed to produce a foam and, in particular, to vinyl chloride plastisol compositions having a silicone resin therein.

The most common types of carpets in use at the present time comprise a fabric base with erect yarn tufts extending upwardly from the base and constituting the pile. Various methods are known for constructing the base and tufting or weaving the pile yarns to it. One particular type of carpet is a tufted carpet which comprises a woven backing usually jute, with loops of yarn pushed through it to form the tufts wherein the loops can be cut if desired. The pile yarns are secured to the backing with a rubber latex. A secondary backing is frequently applied over the latex to provide dimensional stability to the fabric and protect the latex and pile yarns from rubbing.

Carpets of this type often are laid on a floor over an underlay pad which may be a foam rubber product. A foam rubber backing can also be applied to the back of the carpet by foaming rubber latex directly onto the back of the carpet. It is thus possible to apply a precoat onto the pile yarns and then prepare a foam backing directly on the precoat. The use of latex foam in this manner eliminates the need for a secondary backing and an underlay material. The use of most latex rubber foam for this application has major disadvantages, such as a lack of durability, toughness and the fact that it does not retard fire. The need for a foam rubber backing that retards fire is especially pertinent where the carpeting is used in hospitals, nursing homes and other residences where safety is at a premium. In addition to carpet backings there are many other uses for a foam rubber that is fire retardant, that provides a good bond between itself and the material on which it is foamed and, in addition, that has good internal strength or cohesiveness.

It was postulated that vinyl chloride polymers could be frothed to provide such a foam. The vinyl chloride polymer is added along with the appropriate fillers and stabilizers to a plasticizer to form a plastisol. The plastisol can then be whipped or mechanically frothed to form a foam which is applied to the back of a carpet and then heated to gel and fuse the plastisol foam. However, it was found that the plastisol could not be mechanically frothed to form a foam without a suitable foaming agent.

It is thus one object of the present invention to provide a fire retardant vinyl chloride foam that can be foamed onto the backs of carpets.

It is another object of the present invention to provide a silicone resin additive for vinyl chloride plastisols that will permit the plastisol to be mechanically frothed.

It is another aim to provide a vinyl chloride plastisol composition that can be mechanically frothed to provide a foam with uniform cells that defoams slowly.

It is an additional object of the present invention to provide novel silicone resins with a low hydroxyl content which have a high efficiency as foaming agents to permit vinyl chloride plastisols to be formed.

It is yet another object of the present invention to provide solventless silicone resin additives which are foaming agents and are formed by adding a silicone resin with certain select plasticizers and adding the resulting mixture to a vinyl chloride plastisol to permit the plastisol to be mechanically frothed.

These and other objects of the present invention are obtained by means of the invention illustrated below.

SUMMARY OF THE INVENTION

In accordance with the present invention, a composition is provided which can be mechanically frothed with air to produce a foam comprising a vinyl chloride polymer, a plasticizer and a silicone resin uniformly mixed with the polymer and plasticizer and selected from the class consisting of a silicone resin having $R_3SiO_{1/2}$ monofunctional units and $SiO_2$ tetrafunctional units with the ratio of the monfunctional units to the tetrafunctional units 0.25–0.75 and a silicone resin having $R'_3SiO_{1/2}$ monofunctional units, $SiO_2$ tetrafunctional units, and $R^2{}_2SiO$ difunctional units with the ratio of the monofunctional units to the tetrafunctional units to the difunctional units being from 0.25 to 0.75 to 1 to 0.05–0.1, where R and R', $R^2$ are lower hydrocarbon monovalent radicals. There is preferably present in the composition 20–40% by weight of vinyl chloride, 20–50% by weight of plasticizer and 1–8% by weight of silicone resin. Further, the vinyl chloride polymer is selected from vinyl chloride homopolymers and vinyl chloride-vinyl acetate copolymers. To produce efficient foaming agents, the above silicone resins are further reacted such that they have a hydroxyl content of less than about 0.5% by weight. In addition, efficient foaming agents are obtained by adding the above silicone resins with certain select plasticizers such as dioctyl phthalate and then adding the mixture product to the plastisol mixture.

DESCRIPTION OF THE PREFERRED EMBODIMENT

In the above formulas, R and R' and $R^2$ can be, for example, aralkyl, mononuclear aryl, such as phenyl, benzyl, tolyl, xylyl, and ethylphenyl; halogen-substituted mononuclear aryl, such as 2,6-dichlorophenyl, 4-bromophenyl, 2,5-difluorophenyl, 2,4,6-trichlorophenyl and 2,5-dibromophenyl, nitro-substituted mononuclear aryl, such as 4-nitrophenyl and 2,6-dinitrophenyl; alkoxy-substituted mononuclear aryl, such as 4-methoxyphenyl, 2,6-dimethoxyphenyl, and 2-ethoxyphenyl; alkyl such as methyl, ethyl, n-propyl, isopropyl, n-butyl, sec-butyl, isobutyl, tert-butyl, amyl, hexyl, heptyl and octyl; alkenyl such as vinyl, allyl, n-butenyl-1, n-butenyl-2, n-pentenyl-2, n-hexenyl-2, 2,3-dimethylbutenyl-2, and n-heptenyl; alkynyl such as propargyl, and 2-butynyl; haloalkyl such as chloromethyl, iodomethyl, bromomethyl, fluoromethyl, chloroethyl, iodoethyl, bromoethyl, fluoroethyl, trichloromethyl, di-iodoethyl, tribromomethyl, trifluoromethyl, dichloroethyl, chloro-n-propyl, bromo-n-propyl, iodoisopropyl, bromo-n-butyl, bromo-tert-butyl, 1,3,3 - trichlorobutyl, 1,3,3 - tribromobutyl, chloropentyl, bromopentyl, 2,3-dichloropentyl, 3,3-dibromopentyl, chlorohexyl, bromohexyl, 2,4-dichlorohexyl, 1,3 - dibromohexyl, 1,3,4 - trichlorohexyl, chloroheptyl, bromoheptyl, fluoroheptyl, 1,3 - dichloroheptyl, 1,5,5 - trichloroheptyl, 2,4-dichloromethylheptyl, chlorooctyl, bromooctyl, iodooctyl, 2,4 - dichlorooctyl, 2,4,4 - trichloromethylpentyl, and 1,3,5-tribromooctyl, haloalkenyl such as chlorovinyl, bromovinyl, chloroallyl, bromoallyl, 3 - chloro-n-butenyl-1, 3-chloro-n-pentenyl-1, 3 - fluoro-n-heptenyl-1, 1,3,3-trichloro-n-heptenyl-5, 1,3,5-trichloro-n-octenyl-6 and 2,3,3-trichloromethylpentenyl-4; haloalkynyl such as chloropargyl and bromopropargyl; nitroalkyl such as nitromethyl, nitroethyl, nitro-n-propyl, nitro-n-butyl, nitropentyl and 1,3-dinitrobutyl; nitroalkenyl such as nitroallyl, 3-nitro-n-butenyl-1 and 3-nitro-n-heptenyl-1; nitroalkynyl such as nitropropargyl; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, methoxypentyl, methoxymethoxypentyl, methoxyheptyl and ethoxyethoxy; alkoxyalkenyl and polyalkoxyalkenyl such as ethoxyvinyl, ethoxyallyl, butoxyallyl, and methoxy-n-butenyl-1; alkoxyalkynyl and polyalkoxyalkynyl such as methoxypropargyl; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, 6-methylcyclohexyl, 3,4-dichlorocyclohexyl, 2,6-dibromocycloheptyl, 2-nitrocyclopentyl, 1-cyclopentenyl, 3-methyl-1-cyclopentenyl, 5-methoxy-n-cyclopentenyl, 3,4 - dimethyl-1-cyclopentenyl, 2,5-dimethoxy-1-cyclopentenyl, 5-methyl-5-cyclopentenyl, 3,4 - dichloro-5-cyclopentenyl, 2-nitro-1-cyclohexenyl, 1-cyclohexenyl, 3-methyl-1-cyclohexenyl, and 6-methoxy-1-cyclohexenyl; and cyanoalkyl such as cyanomethyl, cyanoethyl, cyanobutyl and cyanoisobutyl.

The radicals represented by R, R′ and R² generally do not have more than 8 carbon atoms and preferably not more than 4 carbon atoms. Preferably, R is methyl so that the first resin with which we are concerned has $(CH_3)_3SiO_{1/2}$ units and $SiO_2$ units. With the second resin, preferably R′ is methyl and R² is methyl and/or vinyl so that we have the following resins:

(a) $(CH_3)_3SiO_{1/2}$, $SiO_2$, $(CH_3)_2SiO$
(b) $(CH_3)_3SiO_{1/2}$, $SiO_2$, $(CH_3)(CH_2=CH)SiO$
(c) $(CH_3)_3SiO_{1/2}$, $SiO_2$, $(CH_2=CH)_2SiO$ and various mixtures of the above resins. Generally, for the first silicone resin the ratio of the $R_3SiO_{1/2}$ monofunctional units to the $SiO_2$ tetrafunctional units is 0.25–0.75 and preferably 0.65–0.70. In the case of the second silicone resin the ratio of the $R_3SiO_{1/2}$ monofunctional units to the $SiO_2$ tetrafunctional units to the $R^2_2SiO$ difunctional units is generally 0.25–0.75 to 1 to 0.05–0.1 and preferably 0.65–0.7 to 1 to 0.05–0.07.

The above resins may be prepared under one method by reacting a silica hydrosol with compounds of the formulas

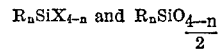

or with compounds of the formulas

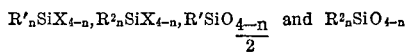

where R, R′ and R² are as defined previously, X is a halogen and $n$ has a value of 2 to 3.

The silica hydrosols employed are prepared in the usual manner by neutralizing sodium silicate solutions. This neutralization may be carried out either by employing an acid or a chlorosilane. In the latter case it is not necessary to add any additional acid to the reaction mixture. Whereas the silica sol at any concentration would react with the above defined organosilicon compounds under acid conditions, it is preferred that the sol have a concentration of from 1 to 35 percent by weight of $SiO_2$.

The silanes and siloxanes may be employed individually or in a mixture. In such cases, the chlorosilane may be added directly to the sodium silicate solution. In the case where alkoxysilanes are employed, it is necessary that the silica hydrosol contain sufficient acid so that the pH of the reaction mixture will be less than five. Suitable acids are hydrochloric, sulfuric, nitric, phosphoric, benzenesulphonic, trichloroacetic or any other type of strong acid. Any amount of excess acid other than that which is necessary to lower the pH below 5 may be employed.

Any of a large group of compounds within the above formulas may be used to prepare this silicone resin. Specific examples of individual compounds which are satisfactory are trimethylchlorosilane,
trimethylethoxysilane,
trimethylisopropoxysilane,
phenyldimethylchlorosilane,
hexamethyldisiloxane,
dimethylsiloxane,
phenyltrichlorosilane,
diethyltetramethyldisiloxane,
tolylmethyldichlorosilane,
methyltriethoxysilane,
stearyltrichlorosilane,
chlorophenyldimethylchlorosilane,
monotolyltrichlorosilane, and
trifluorotolylmethyldichlorosilane.

The silica hydrosol is simply mixed with the silanes and/or siloxanes to form the required silicone resin. As mentioned previously, a strong acid is added to lower the pH to below 5 if a chlorosilane is not involved in the reaction. It has been found that the reactions between silica hydrosol, silanes and/or siloxanes proceeds rapidly at 30° C. or above to produce the copolymeric siloxanes. During the reaction the mixture is preferably thoroughly agitated. In general, an emulsion forms which separates into two layers upon standing. The layers are then separated and the organosilicon layer washed free of acid with water which separates out as an aqueous layer and thus is removed. The organosilicon layer is then dried to yield the silicone resin product. More specific details as to this process can be found in Daudt et al. U.S. Pat. 1,676,182.

Another method for forming the desired resin of the present invention is by the controlled hydrolysis of compounds having the formula $R_nSiX_{4-n}$, $R'_nSiX_{4-n}$ and $R^2_nSiX_{4-n}$ where R, R′ and R² are as previously defined, X represents a halogen atom and $n$ may vary from 2 to 3. In this case, as with the previous process, $R_nSiX_{4-n}$ was used when it was desired to form a resin with $R_nSiO_{1/2}$ units and $SiO_2$ units, while $R'_nSiX_{4-n}$ and $R^2_nSiX_{4-n}$ compounds are used to form the silicone resin with $R'_3SiO_{1/2}$ units, $SiO_2$ units and $R^2_2SiO$ units. The above halogen compounds were reacted with tetrachlorosilane to provide the desired resins. A solution of the halogensilane in an inert non-alcoholic organic solvent is formed in which the organic solvent is insoluble or substantially insoluble in water and is selected from the class consisting of (1) aliphatic and aromatic liquid hydrocarbons, and (2) liquid ethers containing at least 4 carbon atoms. This solution is gradually added to a two-phase hydrolyzing medium comprising a mixture of water in an amount considerably in excess of that calculated as having to hydrolyze the silane, and a liquid aliphatic alcohol which is not completely soluble in water but which dissolves an appreciable amount of water.

Alcohols that are suitable are n-butanol, isobutyl alcohol, n-amyl alcohol, secondary amyl alcohol, isoamyl alcohol, tertiary amyl alcohol, n-hexanol, methylisobutyl carbinol, 2-ethylbutyl carbinol and methylamyl carbinol.

In addition to toluene and xylene which are the preferred non-alcoholic solvents for the silane derivatives, benzene and various saturated or substantially saturated hydrocarbon fractions boiling between 75° and 250° C., such as n-heptane, benzene, ligroin and kerosene can be used. The halosilanes dissolved in the solvent are added to the mixture of water and the alcohol. The mixture is vigorously stirred during the reaction which is exothermic. After the reaction has proceeded to completion, the agitation is discontinued and the reaction mixture allowed to separate into two layers. The lower aqueous layer is removed and the organic layer is separately washed with water and then filtered. The resulting organic mixture is the silane resin mixture that is utilized in the present invention. A more complete description of the above process is explained in Sauer U.S. Pat. 2,398,672.

The silane resin products obtained by the above process generally have 3.0–5.0% by weight of hydroxyl groups. It has been unexpectedly discovered that the silicone resins are substantially more efficient as foaming agents if they have less than 0.5% by weight of hydroxyl groups in the silicone resin and preferably less than 0.3% by weight of hydroxyl groups.

The silicone resins as defined above and produced according to the method discussed above have a high hydroxyl content (3.0–5.0% by weight) which is not reduced by storing the resins for any practical period of time. In fact, such resins, because of their high acid content, will not condense or reduce their hydroxyl content upon being heated at temperatures as high as 150° C. for any practical period of time. In order to obtain the desirable silicone resins which are more efficient in foaming vinyl chloride plastisols, it becomes necessary to further react or process the above silicone resins to obtain products which are substantially different in their foaming properties. To achieve these desirable products, the above silicone resins with 3.0 to 5.0% by weight of hydroxyl groups are made alkaline with KOH or NaOH and heated to the reflux of the solvent which is 115°–120° C. for toluene and 140°–145° C. for xylene. About 200–600 parts per million of the alkali metal hydroxide is added to resin solution containing 40–60% of silicone resin solids. Under these reaction conditions, a silicone resin containing 3.0 to 5.0% by weight hydroxyl groups will require about 3 hours to condense to the point that its silanol is about 0.8–0.9% by weight, and about 6 hours to reduce its hydroxyl content to below 0.5% by weight and about 9 hours to reduce its hydroxyl content to below 0.3% by weight.

The silicone resins defined above, with a hydroxyl content of less than about 0.5% by weight, were found to be in most cases 10–30% more efficient than the silicone resins with the high hydroxyl content, that is, with certain plastisols the condensed silicone resins yielded a foam with a density that was about 10–30% less than the densities of the unreacted, high hydroxyl content silicone resins. It is thus obvious that the low hydroxyl content silicone resins are preferable in most applications for foaming vinyl chloride plastisols in that a more thoroughly foamed material is obtained. Further, the foam produced is more homogeneous and retains its form for a longer period of time than is the case when the high hydroxyl content silicone resins are used.

A plastisol such as that used in the present invention is a two-phase system in which a vinyl chloride polymer in small particulared form is dispersed in a plasticizer which has little solvating action for the polymer at room temperature but will dissolve the polymer at an elevated temperature and cause the mixture of the plasticizer and the polymer to fuse into a plasticized structure. Many different types of vinyl chloride polymers may be used such as vinyl chloride homopolymer or a copolymer of vinyl chloride with other ethylenically unsaturated monomers, or a mixture of the homopolymer with other vinyl chloride copolymers. The vinyl chloride polymers generally have at least 50% by weight of polymerized vinyl chloride and preferably 60 to 100% by weight.

The copolymers are formed by polymerizing vinyl chloride with ethylenically unsaturated monomers such as lower alkyl unsaturated esters which include vinyl acetate, partially hydrolyzed vinyl acetate and vinyl benzoate; lower alkyl acrylates which include methyl acrylate, ethyl acrylate, butyl acrylate and octyl acrylate and the corresponding methacrylates; alkyl esters of unsaturated acids such as maleic and fumeric acids and diethyl maleate, as well as other copolymerizable compounds such as unsaturated nitriles which include acrylonitrile; halogenated hydrocarbons which include vinylidene chloride and fluoride, vinyl fluoride, chlorotrifluoroethylene, and other polymerizable compounds containing ethylenic unsaturation. The preferable copolymers are the vinyl chloride-vinylacetate copolymers, particularly those containing 85% by weight or more of vinyl chloride polymerized therein.

Typical vinyl chloride polymers which include vinyl chloride homopolymer dispersion grade resins and vinyl acetate-vinyl chloride copolymers are Opalon 400, 410, 440 and 3142 manufactured by Monsanto Chemical Company, Springfield, Mass.; Tenneco 1755 and 0565 manufactured by Tenneco Chemicals, Inc., East Brunswick, N.J.; Diamond 74, 71, 7602 and 7401 manufactured by the Diamond Shamrock Chemical Company, Cleveland, Ohio; Geon 121, Geon 130 x 10, Geon 120 x 241 and Geon 135 manufactured by the B. F. Goodrich Chemical Co., Cleveland, Ohio; Exon 6338 and 605 manufactured by Firestone Plastics Co., Pottstown, Pa., Marvinol VR–50, 51, 53, 56 and 57 manufactured by Uniroyal Chemical Co., Naugatuck, Conn., GYLF–Z manufactured by the Union Carbide Corporation, and VC–2605 manufactured by the Borden Chemical Co. About 30 to 40% by weight of these total vinyl chloride polymers added to form the plastisol may include a large particle size resin or blending resin such as Marvinol VR–10, 15, 24; Borden's VC–2605 and 260S manufactured by the Borden Chemical Company; Diamond's 744 and 7442 manufactured by the Diamond Shamrock Chemical Co.; Firestone's XR 2316 and XR 2322 manufactured by the Firestone Plastics Co., Geon 106F2 manufactured by the B. F. Goodrich Chemical Co., Marvinol 14 manufactured by Uniroyal Chemical Co., Naugatuck, Conn., and MC–85 manufactured by the Goodyear Tire and Rubber Co., Akron, Ohio. These blending vinyl chloride resins appear to lower the viscosity of the resulting plastisol. However, the primary reason for their addition to small size vinyl chloride polymer resin is their cheapness in comparison to the small sized vinyl chloride dispersion resins. Thus, by adding a certain amount of the blending resin, the cost of the resulting plastisol can be reduced. It is also to be noted that surfactant used to produce the particular resin will affect the resin mechanical frothability and that as a result certain of the above vinyl chloride resins produced with certain surfactants produce better foams.

The vinyl chloride resin generally comprises 20–40% by weight of the plastisol composition and preferably 25–35% by weight. In the plastisol composition there is also generally 20–50% by weight of plasticizer and preferably 30–40% by weight of plasticizer with generally 1–8% by weight of silicone resin and preferably 1–5% by weight of the silicone resin.

The liquid plasticizer is used in varying amounts depending upon the resin employed and the desired properties of the final product. Typical plasticizers include dioctyl phthalate, dihexyl phthalate, diisodecyl phthalate, butyldecyl phthalate, diisooctyl phthalate, n-octyldecyl phthalate, dicapryl phthalate, isooctylisodecyl phthalate, butylcyclohexyl phthalate, di-2-ethylhexylhydrophthalate, trioctyl phosphate, tricresyl phosphate, di(2-ethylhexyl) adipate, di(2-ethylhexyl) acetate, dioctyl sebicate; diisodecyl adipate, butylbenzyl phthalate, butyloctyl phthalate, dodecyl phthalate; trioctyl trimellitate, n-octyl-n-decyl trimellitate, triisooctyl trimellitate, dipropyl glycol dibenzoate. Polymeric plasticizer may also be used such as Nuopled 1046 manufactured by the Nuodex Co., Paraplex 6–54, 6–62 manufactured by Rohm & Haas Co., Santicizer 140, 148 and 462 manufactured by the Monsanto Chemical Co., Staflex 347 manufactured by the Reinhold Chemical Co., epoxy-type of plasticizers such as Monoflex S–73 and S–61 and S–62 manufactured by Rohm & Haas Co., XP–2007 manufactured by Rohm & Haas Co., Admex 752 manufactured by Archer, Daniels and Midland; Emery 12706–40–R manufactured by Emery Industry, Inc., and Fleximore 50–T manufactured by Rohm & Haas. Other plasticizers are Kodaflex CB–2, Kodaflex DOA, Kodaflex DOZ, Kodaflex DBS manufactured by Eastman Chemical Co., Kingsport, Tenn., Benzoflex 9–88 manufactured by Velsichel Chemical Co., Chattanooga, Tenn., HB–40 manufactured by Monsanto Chemical Co., St. Louis, Mo. The above is just a sample of the many plasticizers that can be used to form the vinyl chloride plastisol. The condensed silicone resins, that is the resins having 0.5% by weight or less of hydroxyl groups, are advantageously used with the Kodaflex CB–2, Texanol isobutyrate, as well as with adipate, sebicate and azelate ester plasticizers since it was found that efficient foams were produced with such plasticizers only with the condensed resins.

Both the condensed and uncondensed silicone resins may be added to the plasticizer in the form of 40–60% by weight solutions in the solvents in which they are prepared, such as xylene and toluene. However, it was found that the presence of these solvents tended to shorten the life of the foam as well as cause the foam to be non-homogeneous. In experimenting with other solvents and plasticizers as carriers for the silicone resins prior to their incorporation into the plastisols, it was found that certain select plasticizers were efficient carriers for the silicone resin to produce a product which had good efficiency in foaming plastisols such that the density of the foam product was 5–15% less than the density of the foam produced using the uncondensed silicone resins. It was further discovered that the silicone resin, plasticizer product considerably enhanced the half-life of the plastisol foam produced. Further, differences in performance between different batches of silicone resins as foaming agents for vinyl chloride plastisols is decreased. In addition, these novel foaming agents can be produced from both silicone resins having a hydroxyl content of 3.0 to 5.0% by weight and silicone resins having less than about 0.5% hydroxyl groups.

The novel foaming agents are prepared by adding to the silicone resin which is dissolved in a solvent such as xylene a sufficient amount of the selected plasticizers which will hereafter be referred to as carrier plasticizers so as to form a product having 20–80% by weight therein of silicone resin based on the total weight of the reactant plasticizer and silicone resin. Preferably, there is a 1 to 1 ratio in the amounts of silicone resin to the amount of reactant plasticizer. The silicone resin is permitted to mix with the carrier plasticizer for a period of 1 to 2 hours at room temperature. Then xylene present with the reaction solvent is stripped off under vacuum at 90°–100° C. Most of the xylene is preferably removed since the presence of xylene tends to produce an unstable foam, that is a foam that has a short half-life. The half-life of a foam is the time necessary for a completely frothed foam to break down so that half of the foam has returned to a liquid state. However, it has been found desirable to leave a small amount of the xylene mixed with the reaction product so as to decrease its viscosity so that the reaction product can be easily handled in processing equipment. Thus, the xylene is distilled off until there is present 95.0 to 98.0% by weight of reaction product in the reaction mixture. It was discovered that by simply increasing the xylene content by 3.0% by weight in the mixture so that there is 8.0% by weight of xylene in the mixture that the viscosity of the mixture is decreased by more than 50%.

The silicone resin carrier plasticizer product with a small amount of xylene can then be stored in suitable containers for any period of time prior to use as a foaming agent or it can be incorporated immediately into the vinyl chloride plastisol prior to frothing of the plastisol. It was noticed that the product foaming agent mixed very easily with the plastisol and permitted a good foam to be formed very easily and quickly. Usually with the above product, only five minutes of frothing was needed to form a good foam while with the usual silicone resins defined above at least 10 minutes of frothing time was needed to form a good foam. The manner in which the silicone resin associated with the carrier plasticizer was incapable of determination. It was noticed that when the silicone resin was incorporated into the carrier plasticizer that any excess plasticizer or silicone resin could not be separated from the mixture. The foaming agent product is simply incorporated into the plastisol mixture or added to the plasticizer prior to its being mixed with the vinyl chloride polymer to form the plastisol which is then frothed to form the foam. If the product is first added to the plasticizer, the product mixture can be kept for a long period of time before the plasticizer is actually used to form the foam. None of the procedures for forming the foams need be changed in using the foaming agent product. Further, as pointed out above, the mixing time as well as the procedure is simplified by using the product as the foaming agent instead of the usual condensed and uncondensed silicone resins.

There are only certain select carrier plasticizers that can be used to form the foaming agent product as compared to the large amount of plasticizers presently available. The carrier plasticizers which are suitable are dioctyl phthalate, diisodecyl phthalate, dihexyl phthalate, butyldecyl phthalate, diisooctyl phthalate, n-octyldecyl phthalate, isooctylisodecyl phthalate, Texenol isobutyrate (Tenn. Eastman), dioctyl azelate, dioctyl adipate, hexadecanol and isopropyl myristate. Other plasticizers were found not to associate with the silicone resin to form the novel product but yielded mixtures which were not more efficient than usual silicone resins in frothing plastisol foams. In fact, most of the plasticizers other than the carrier plasticizers were less efficient in permitting plastisols to be frothed than were the usual silicone resins which were incorporated into the plastisol solutions as xylene solutions. This foaming agent product was also found to be imminently suitable as an additive in cosmetics.

The vinyl chloride polymer plastisol may contain various additives such as heat and light stablizers. Suitable stabilizers are complexes of barium, zinc, cadmium, lead, tin and calcium salts of fatty acids. Other stabilizers that may be used are Paria 10 manufactured by the Rheinhold Chemical Co., Vanstay HTA manufactured by the Vanderbilt Co., Ferro 5730 manufactured by the Ferro Chemical Co., Nuodex V–1048 manufactured by Tenneco Chemical Co., Advance BC-72, Advance T-5, Advance Liquid T-150 manufactured by the Advance Chemical Co., and Dyphos paste manufactured by National Lead Co. Generally, such stabilizers are incorporated 0.4% by weight of the plastisol composition and preferably 1-3% by weight.

There may also be included in the plastisol composition fillers, pigments and extenders. Suitable fillers are calcium carbonate, barytes and mica. In this case, low-oil absorbing fillers are preferred. Generally, the stabilizers with the fillers and extenders comprise 0-50% by weight of the plastisol composition and preferably 20-30% by weight.

In preparing the plastisol composition of the present invention, all the liquid system is charged to the high shear mixer with the exception of the surfactant. The vinyl dispersion resin is then added to the mixer at a slow, even rate. Then the vinyl blending resin is added to the mixer at a slow, even rate. At the point the pigment dispersion, filler and other ingredients are added, the speed of the mixer is reduced and the silicone resin is added. Reduced speed is necessary to prevent entrapment of large volumes of air at this point. Then, if the composition is to be foamed, the speed of the mixer is increased to high speed so that large volumes of air can be entrapped in the foam so as to properly froth it. In order to obtain a good foam, the plastisol composition has preferably a viscosity of 1,000 to 1,500 cps. with a Brookfield Spindle No. 2 at 20 r.p.m. Preferably, the mixing of the plasticizer with the other ingredients takes place at room temperature.

To prepare the foam, the liquid plastisol is mechanically beaten or whipped to contain air in the foam. The beating of the plastisol may take place in a kitchen type mixer such as Hobart N-50 or an E. T. Oakes continuous type of mixer. The E. T. Oakes continuous mixer is an individual system in which air, usually compressed air, is mixed into the fluid material. The Hobart mixer utilizes a wire whip that whips air into the foam located in a bowl without the use of an individual system of compressed air. The amount of air from the atmosphere that can be entrained in the foam with the Hobart mixer is substantially less than that which can be entrained with the continuous type of mixer. Generally, one-third of the amount of air that can be entrained by the Oakes continuous mixer can be entrained by the Hobart mixer. In general, the more air that can be compacted into the foam, the lower the density of the finished foam product.

The presence of the polysiloxane resin in the foam stabilizes the foam so that it does not start to collapse immediately after it has been formed. However, after about ten minutes it will start to collapse so that preferably it is heated 5-10 minutes after it has been formed so as to gel and cure the foam.

The plastisol foam composition is gelled and fused by heating the foam at an elevated temperature. The elevated temperature at which the foam is gelled depends upon the types of vinyl chloride polymers and plasticizers employed, as well as the thickness and density of the foam. In general, after the foam has been spread or poured into the desired mold, it is heated to a temperature in the range of 270°-375° F. for from thirty seconds to two hours to gel and fuse the plastisol. If gelation is effected as a separate step, then the plastisol is heated at a temperature of 140°-190° F. for from about ten minutes to two hours to solidify the foam to a soft gel. The gelled foam may then be fused by heating it at a temperature in the range of 300° to 375° C. for from thirty seconds to two hours. Preferably, gelation and fusion is carried out in a single step so that in general the plastisol foam is rapidly heated to 350° F. for twelve to fifteen minutes to complete the operation. When fusion occurs, discrete closed cells in the foam become interconnected or opened cell. After the heating step, the fused foam is cooled to room temperature to yield a flexible foam material having uniform sized, open cells. Depending on the amount of air that has been incorporated into the plastisol, foam densities may vary over a wide range from about 10 pounds per cubic foot to 70 pounds per cubic foot, depending on whether the usual uncondensed silicone resins are used, the condensed silicone resins are used or the carrier plasticizer product silicone resins are used.

The following examples are used to illustrate the invention and are not intended to limit the invention in any way. All parts are by weight unless specified otherwise. In one type of test the polysiloxane resin was tested with different types of plasticizers to determine whether they would foam. In such tests, foam in a 3 oz. Lilly cup that had a weight value of less than 15 grams was determined by experience to yield good foams upon cure that is final cured foam, with a density of 17-20 pounds per cubic foot. The density 17-20 pounds per cubic foot is desirable density for foam that is to be used for backing carpets. In another type of test the polysiloxane resin was mixed with vinyl chloride polymer, plasticizer and the other necessary ingredients and mechanically foamed. A 3 oz. Lilly cup of foam was weighed to determine whether a good foam could be made in a density of 17-20 pounds per cubic foot. From experience it has been determined that a Lilly cup weight of plastisol composition that has a value of less than 45 grams yields a good foam that is a foam with a density of 17-20 pounds per cubic foot.

EXAMPLE 1

This test evaluated the frothability of different plasticizers combined with condensed and uncondensed polysiloxane resins. The polysiloxane resins used were:

| Symbol | Composition | Solution |
|---|---|---|
| X | Uncondensed $(CH_3)_3SiO_{1/2}$, $SiO_2$ | 50% solid solution in zylene. |
| 2X | Uncondensed $(CH_3)_3SiO_{1/2}$, $SiO_2$ mixed with dioctyl phthalate at a ratio of 1 to 1. | |
| 3X | Condensed $(CH_3)_3SiO_{1/2}$, $SiO_2$ having less than 0.5% by weight hydroxyl groups. | Do. |

The ratio of the $(CH_3)_3SiO_{1/2}$ monofunctional units to $SiO_2$ tetrafunctional units was 0.65-0.70. In the mixing bowl there was added 240 parts of plasticizer to which was added 12 parts polysiloxane resin. The mixture was frothed with the wire whip attachment of the Hobart N-50 at speed 2 for five minutes. A 3 oz. cup was then filled with the foam and weighed to yield the results of Table I below.

TABLE I 3 oz. cup weights of various plasticizers using different surfactants

| Plasticizer | X | 2X | 3X |
|---|---|---|---|
| DOP (dioctyl phthalate) | 17 | 16 | 14 |
| DIOP (di-iso-octyl phthalate) | 21 | 20 | 12 |
| DIDP (di-iso-decyl phthalate) | 18 | 16 | 14 |
| XP-2007 manufactured by Rohm & Haas | 15 | 14 | 14 |
| Santicizer 7-11 manufactured by Monsanto Chemical Company | 16 | 15 | 14 |
| Monoflex S-13 manufactured by Rohm & Haas | 16 | 15 | 15 |
| Kodaflex CB-2 manufactured by Tenn. Eastman | 23 | 21 | 13 |
| Santicizer 7-11 (50 p) manufactured by Monsanto Chemical Company, Benzoflex 9-88 (30 p) manufactured by Velsichol Chemical Company | 17 | 16 | 13 |
| Kodaflex DOA manufactured by Tenn. Eastman | 25 | 22 | 11 |
| Kodaflex DOZ manufactured by Tenn. Eastman | 20 | 18 | 12 |
| Kodaflex DBS manufactured by Tenn. Eastman | 27 | 22 | 11 |

EXAMPLE 2

Into a Hobart N-50 mixing bowl there was weighed 240 parts of plasticizer and 12 parts of the polysiloxane resin identified as 2X in Example 1. While the wire whip of the Hobart mixer was blending the above components at speed 1, 300 parts of vinyl resin was added and the total mixture agitated for 5 minutes. Then the mixture was frothed at speed 2 to 20 minutes. The resulting foam was weighted in a typical 3 oz. Lilly cup. As discussed previously, a weight of 45 grams or less indicates that a foam could be processed in an Oakes to 17–20 pounds per cubic foot for carpet backing. The results were set forth in Table II below.

TABLE II

Resin and plasticizer in 3 ounce cup weight

| Vinyl chloride resin | Plasticizer | | |
|---|---|---|---|
| | DOP | DIDP | Santicizer 215 |
| Opalon 400 (Monsanto) [1] | 51 | 48 | 41 |
| Marvinol 57 (Uniroyal) [2] | 49 | 46 | 39 |
| Diamond Shamrock 7602 (Diamond Shamrock) [2] | 51 | 50 | 41 |
| Diamond Shamrock 7401 (Diamond Shamrock) [1] | 44 | 48 | 41 |
| Diamond Shamrock 744 (Diamond Shamrock) [3] | 45 | 42 | 35 |
| Diamond Shamrock 71 (Diamond Shamrock) [2][3] | 50 | 51 | 41 |
| Geon 120 x 241 (Goodrich) [2] | | 48 | 45 |
| Geon 135 (Goodrich) [1] | | 48 | 45 |
| Geon 130 x 10 (Goodrich) [1] | | 47 | 42 |
| Borden VC-2605 (Borden) | 70 | 47 | 45 |
| XR-2322 (Firestone) [3] | | 39 | 36 |
| Exon 654 (Firestone) [2] | | 42 | 45 |
| XR-2316 (Firestone) [3] | | 43 | 45 |
| Exon 640 (Firestone) [2] | | 45 | 44 |
| Exon 6337 (Firestone) | | 43 | 46 |
| Exon 6338 (Firestone) | | 42 | 41 |

[1] Copolymer resin.
[2] Homopolymer resin.
[3] Blending resin.
NOTE.—The manufacturers of the vinyl chloride resins are set forth in parenthesis.

The results in Table II illustrate the manner in which the density of the final foam can vary depending on the vinyl chloride polymer and plasticizer used.

EXAMPLE 3

The same test as in Example 2 was carried out with a blend of plasticizers. The results are set forth in Table III below.

TABLE III

Resin and plasticizer 3 ounce cup weight

| Viny chloride resin | Blend plasticizers | |
|---|---|---|
| | DIDP and butyl benzyl phthalate [a] | Santicizer 215 and butyl benzyl phthalate [b] |
| Opalon 400 (Monsanto) [1] | 42 | 39 |
| XR-2327 (Firestone) [1] | 45 | 46 |
| Diamond Shamrock 7401 (Diamond) [1] | 43 | 42 |
| Diamond Shamrock 71 (Diamond) [2] | 42 | 41 |
| Marvinol 57 (Uniroyal) [2] | 47 | 41 |
| Borden VC-258 (Borden) [3] | 42 | 44 |
| XR-2322 (Firestone) [3] | | 41 |
| Exon 654 (Firestone) [3] | | 41 |
| XR-2313 (Firestone) [3] | | 45 |
| Exon 640 (Firestone) [2] | | 43 |
| Tennus 0565 (Tenneco) [1] | | 45 |
| Exon 6338 (Firestone) | | 43 |

[1] Copolymer resin.
[2] Homopolymer.
[3] Blending resin.
[a] Primary plasticizer (Monsanto).
[b] High solvating plasticizer (Monsanto).

NOTE.—Manufacturers are indicated in parentheses.

EXAMPLE 4

Plastisol compositions were prepared using the following acetate modified dispersion resins: Opalon 400; Tenneco 0565; Diamond 74; Diamond 7401; Geon 130 x 10; Geon 120 x 241; Geon 135; Exon 6338; and Marvinol 57. The manufacturers of these resins were identified previously.

The plastisol compositions had the following low fusion blending resins therein: Borden's 265; Borden's 260S; Diamond's 744L; Geon 106F2; Exon 2322; MC-85; and Marvinol 14. The manufacturers of these resins have also been identified previously.

These resins were utilized in the following plastisol formulations.

Formula A

| Component: | Parts |
|---|---|
| Acetate modified dispersion resin | 60 |
| Low fusion blending resin | 40 |
| Santicizer 7-11 [1] | 50–70 |
| Butyl benzyl phthalate | 20–30 |
| 2X [2] | 2–5 |
| Filler ($CaCO_3$ or LuFil) | 10–50 |
| Color | 0–2 |
| Advance BC-103 [3] | 3 |
| Mineral spirits | 0–4 |

[1] Monsanto Chemical Company.
[2] The same composition as polysiloxane resin 2X of Example 1.
[3] Advance Div., Carlisle Chemical Ind., New Brunswick, N.J.

Formula B

| Component: | Parts |
|---|---|
| Acetate modified dispersion resin | 60 |
| Low fusion blending resin | 40 |
| Dioctyl phthalate | 50–70 |
| Santicizer 160 [1] | 20–30 |
| Advance BC-103 [2] | 3 |
| 2X [3] | 2–5 |
| Mineral spirits | 0–4 |
| Filler ($CnCO_3$ or LuFil) | 10–50 |
| Color | 0–2 |

[1] Monsanto Chemical Co.
[2] The same composition as polysiloxane resin 2X of Example 1.
[3] Advance Div., Carlisle Chemical Ind., New Brunswick, N.J.

Formula C

| Component: | Parts |
|---|---|
| Acetate modified dispersion resin | 60 |
| Low fusion blending resin | 40 |
| Kodaflex CB-2 [1] | 75–100 |
| $K_4CO_6$ 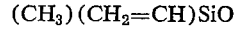 | |
| Ferro 5019 or 6U6A or Dythal | 3 |
| Filler | 10–50 |
| 3X [2] | 2–5 |
| Color | 0–2 |

[1] Manufactured by Eastman Chemical Co.
[2] The same composition as condensed polysiloxane resin 3X of Example 1.

The plastisol composition was prepared by charging all the liquid systems to a Hobart type high shear mixer with the exception of the polysiloxane resins. The vinyl chloride dispersion resin is added to the mixer at a slow, even rate while the mixer is operating. Then the blending resin is added at a slow, even rate. Finally, the filler, pigment and other ingredients are added. The speed of the mixer is reduced and the polysiloxane resin is added. After the polysiloxane resin had been added the speed of the mixer is moved to speed 2 and the plastisol allowed to froth for about 20 minutes. The foam is then applied to the back of a carpet with a doctor blade. The carpet is then placed in an oven at 280° F. for 10–15 minutes. The foamed carpet is then removed and cooled to yield a finished product. All the above formulations A, B and C yielded suitable foam backings for carpets having a density of 17–20 pounds per cubic foot when run on an Oakes mixer.

EXAMPLE 5

The tests set forth in this example were conducted with a condensed polysiloxane resin having $(CH_3)_3SiO_{1/2}$ monofunctional units, $SiO_2$ tetrafunctional units and $$(CH_3)(CH_2=CH)SiO$$

difunctional units where the ratio of the monofunctional units to the tetrafunctional units to the difunctional units is from 0.70 to 1 to 0.05. The polysiloxane resin was frothed repeatedly with Kodaflex CB-2 plasticizer and yielded a 3 ounce Lilly cup weight of foam of 14–15 grams. In carrying out the test 12 parts of polysiloxane resin was added to 240 parts of plasticizer and the mixture frothed on a Hobart N-50 mixer. The polysiloxane resin was additionally tested in the two formulas.

Formulation A

| Component: | Parts |
|---|---|
| Opalon 400 | 210 |
| Borden's 260S | 90 |
| Kodaflex CB-2 | 240 |
| Dythal | 9 |
| Polysiloxane resin | 12 |

Formulation B

| Component: | Parts |
|---|---|
| Diamond Shamrock's 74 | 180 |
| Borden's 260S | 120 |
| Kodaflex CB-2 | 240 |
| Dythal | 9 |
| Polysiloxane resin | 12 |

The polysiloxane resin was added to the above formulations and the resulting plastisol was frothed for twenty minutes. Various tests yield the following weights of 3 ounce cup samples of the foams.

| Formulation A, grams: | Formulation B, grams: |
|---|---|
| 32 | 38 |
| 44 | |
| 33 | |
| 32 | |
| 33 | |

As mentioned previously, a value of 45 grams or less in the weight of a 3 ounce Lilly cup full of foam indicates that the foam is highly desirable for carpet backing since it will cure to produce a foam having a density of 17–20 pounds per cubic foot when run in an Oakes mixer. A foam prepared in accordance with formulations (A) and (B) to which was also added fillers and a color additive was applied to the back of a carpet and cured. The final foam product had a density of 17–20 pounds per cubic foot.

EXAMPLE 6

A silicone resin having $(CH_3)_3SiO_{1/2}$ monofunctional units and $SiO_2$ tetrafunctional units in the ratio of 0.65–0.70 and having 3.0 to 5.0% by weight of hydroxyl groups is added to the following reactant plasticizers: dioctyl phthalate, diisodecyl phthalate and dihexyl phthalate. There is added 1 part of silicone resin for each part of the reactant plasticizer. The xylene in the reaction mixture is removed under vacuum until there is 5.0% by weight of xylene mixed with the reaction product. The reaction product is added to quantities of the same plasticizer so that there is present 1.5 parts of silicone resin per 100 parts of additional plasticizer and the resultant mixture is frothed. The foam as formed is placed in a 3 ounce Lilly cup and weighed. As stated previously, a 3 ounce Lilly cup of foam that weighs 15 grams or less indicates a very efficient foaming agent since it forms foams having a density of 17–20 pounds per cubic foot that are particularly desirable for carpet backing. The above tests were carried out for two different batches of silicone resins, Batch A and Batch B. The results are shown in Table IV below.

TABLE IV

| Silicone resin and reactant plasticizer reaction product | Plasticizer | 3.0 ounce Lilly cup wt. gm. | Half-life of foam, min. |
|---|---|---|---|
| Batch A/dioctyl phthalate | Dioctyl phthalate | 14.1 | 145 |
| Batch A/diisodecyl phthalate | Diisodecyl phthalate | 15.0 | 150 |
| Batch A/dihexyl phthalate | Dihexyl phthalate | 15.5 | 100 |
| Batch B/dioctyl phthalate | Dioctyl phthalate | 14.8 | 135 |
| Batch B/diisodecyl phthalate | Diisodecyl phthalate | 15.0 | 170 |
| Batch B/dihexyl phthalate | Dihexyl phthalate | 14.5 | 140 |
| Control—Batch A as 60% solution in xylene. | Dioctyl phthalate | 20 | 48 |

The same tests were conducted in which there was present silicone resin from Batch A and Batch B mixed with an equal amount of dioctyl phthalate plasticizer to form the product which was added to additional amounts of dioctyl phthalate such that there was 1 part and 0.75 part of initial silicone resin from Batches A and B for every 100 parts of additional dioctyl phthalate added to the products. The results of these tests which are set forth in Table V below illustrate the effect of different silicone resin batches on the density of the foam. As before, the product, plasticizer mixture is frothed for five minutes and the froth weighed in a 3 ounce Lilly cup.

TABLE V

| Parts of silicone resin | Batch of silicone resin | Carrier plasticizer | Additional plasticizer | 3 oz. cup wt., gm. |
|---|---|---|---|---|
| 1 | A | Dioctyl phthalate. | Dioctyl phthalate. | 15 |
| 1 | B | ...do... | ...do... | 16 |
| 0.75 | A | ...do... | ...do... | 17 |
| 0.75 | B | ...do... | ...do... | 16.5 |

It is seen that contrary to the case where xylene is used as a solvent for a silicone resin to produce a foaming agent there is very little difference in the density of the foam when using different batches of silicone resin to form reaction products which are used as foaming agents.

EXAMPLE 7

R. T. Vanderbilt, Inc., a company that is active in polyvinyl chloride technology markets a series of products, Formula B, Formula D and Formula S-12 that are useful frothing agents for polyvinyl chloride foams. The formulas are emulsifier systems consisting basically of a non-ionic emulsifier (polyethylene glycol monolaurate) and an anionic emulsifier (potassium oleate). Froth tests were run by incorporating these products into three different plasticizers, dihexyl phthalate (DP), dioctyl phthalate (DOP) and diisodecyl phthalate (DIDP) adn the 3 ounce cup weights are set forth in Table VI below. The formulas were run at 15 parts a load recommended by Vanderbilt. These results are compared to a froth test using the silicone resin of Example 6 mixed with dioctyl phthalate at a 1 to 1 ratio which was then mixed with additional amounts of the three plasticizers and frothed. The product was used at 5.5 parts, an economically equivalent level.

TABLE VI

| Foaming agent | Parts | DP | DOP | DIDP |
|---|---|---|---|---|
| Formula: | | | | |
| B | 15.0 | 39.0 | 53.3 | 82.6 |
| D | 15.0 | 40.5 | 12.1 | 82.5 |
| S-12 | 15.0 | 17.1 | 22.0 | 24.7 |
| Silicone resin/dioctyl phthalate product with 5% by weight xylene | 5.5 | 14.5 | 15.1 | 15.8 |

As can be seen from these results, the silicone resin product was at least 10% more efficient than the other foaming agents, that is the product yielded foams with a density of at least 10% less than the foams formed from the other foaming agents.

The product in the above test had 5% by weight xylene in it so as to lower its viscosity so that the reaction product can be processed easily. However, it should be recognized that the product need not have any solvent such as xylene in it in order to be used as an efficient foaming agent.

What we claim is:

1. A composition which can be mechanically frothed with air to produce a foam comprising a vinyl chloride polymer, a plasticizer uniformly mixed with said vinyl chloride polymer and 1 to 8% weight of a silicone resin uniformly mixed with said polymer and said plasticizer, said silicone resin having $R'_3SiO_{1/2}$ monofunctional units, $SiO_2$ tetrafunctional units, and $R^2{}_2SiO$ difunctional units with the ratio of the monofunctional to the tetrafunctional to the difunctional units being from 0.24–0.75 to 1 to 0.05–0.1 and with less than 0.5% by weight of hydroxyl groups and where $R'$, $R^2$ represent a radical selected from aralkyl, alkyl, alkenyl, alkynyl, haloalkyl, haloalkenyl, haloalkynyl, nitroalkyl, nitroalkenyl, nitroalkynyl, alkoxyalkyl and polyalkoxyalkyl, alkoxyalkenyl and polyalkoxyalkenyl, alkoxyalkynyl and polyalkoxyalkynyl, cycloalkyl, cycloalkenyl and alkyl, halogen, alkoxy and nitro-substituted cycloalkyl and cycloalkenyl, cyanoalkyl, mononuclear aryl, halogen-substituted mononuclear aryl, nitro-substituted mononuclear and alkoxy-substituted mononuclear aryl such that the radicals represented by $R'$ and $R^2$ have no more than 8 carbon atoms.

2. The composition as set forth in claim 1 wherein the plasticizer is selected from the group consisting of dihexyl phthalate, butyldiacyl phthalate, diisoorthyl phthalate, di(2-ethylhexyl) phthalate, n-octyldecyl phthalate, dicapryl phthalate, isooctyl isodecyl phthalate, butylcyclohexyl phthalate, di-2-ethylexylhexahydro phthalate, trioctyl phosphate, tricresyl phosphate, di(2-ethylhexyl) adipate, di(2-ethylhexyl) azelate, dioctyl sebacate and diisodecyl adipate.

3. A process for preparing a polyvinyl foam comprising mixing a vinyl chloride polymer with a plasticizer and then adding to the mixture from 1 to 8% by weight of a silicone resin having $R'_3SiO_{1/2}$ monofunctional units, $SiO_2$ tetrafunctional units and $R^2{}_2SiO$ difunctional units where the ratio of monofunctional to tetrafunctional to difunctional units is from 0.25–0.75 to 1 to 0.05–9.1 with less than 0.5% by weight hydroxyl groups and where $R'$ and $R^2$ represent a radical selected from aralkyl, alkyl, alkenyl, alkynyl, haloalkyl, haloalkenyl, nitroalkyl, nitroalkenyl, nitroalkynyl, alkoxyalkyl and polyalkoxyalkyl, alkoxyalkenyl and polyalkoxyalkenyl, alkoxyalkynyl and polyalkoxyalkynyl, cycloalkyl, cycloalkenyl and alkyl halogen, alkoxy and nitro-substituted cycloalkyl and cycloalkenyl, cyanoalkyl, mononuclaer aryl, halogen-substituted mononuclear aryl, nitro-substituted mononuclear aryl and alkoxy-substituted mononuclear aryl such that the radicals represented by $R'$, $R^2$ have no more than 8 carbon atoms.

4. The process of claim 3 further comprising mechanically frothing the mixture of the vinyl chloride polymer plasticizer and silicone resin to form a liquid foam, heating the liquid foam to an elevated temperature to cause the vinyl chloride polymer to fuse into a porous structure and cooling the foam to room temperature.

5. The process of claim 3 wherein there is present 20–40% by weight of vinyl chloride polymer and 20–50% by weight of plasticizer.

6. The process as set forth in claim 3 wherein the plasticizer is selected from the group consisting of dihexyl phthalate, butyldecyl phthalate, diisooctyl phthalate, di(2-ethylhexyl) phthalate, n-octyldecyl phthalate, diisopropyl phthalate, butylcyclohexyl phthalate, di-2-ethylhexylhexahydro phthalate, trioctyl phosphate, tricresyl phosphate, di(2-ethylhexyl) adipate, di(2-ethylhexyl) azelate, dioctyl sebacate and diisodecyl adipate.

7. The process of claim 6 wherein R is methyl, $R'$ is methyl and $R^2$ is methyl and vinyl.

8. A vinyl chloride polymer foam having a uniform, open-cell structure comprising a fused vinyl chloride polymer plastisol foam containing from 1 to 8% by weight of a silicone resin having $R'_3SiO_{1/2}$ monofunctional units, $SiO_2$ tetrafunctional units and $R^2{}_2SiO$ difunctional units with the ratio of the monofunctional to the tetrafunctional to difunctional units being from 0.25–0.75 to 1 to 0.05–0.1 with less than 0.5% by weight of hydroxyl groups and where $R'$, $R^2$ represent a radical selected from aralkyl, alkyl, alkenyl, alkynyl, haloalkyl, haloalkenyl, haloalkynyl, nitroalkyl, nitroalkenyl, nitroalkynyl, alkoxyalkyl and polyalkoxyalkyl, alkoxyalkenyl and polyalkoxyalkenyl, alkoxyalkynyl and polyalkoxyalkynyl, cycloalkyl, cycloalkenyl and alkyl, halogen, alkoxy and nitro-substituted cycloalkyl and cycloalkenyl, cyanoalkyl, mononuclear aryl, halogen-substituted mononuclear aryl, nitro-substituted mononuclear aryl and alkoxy-substituted mononuclear aryl such that the radicals represented by $R'$, $R^2$ have no more than 8 carbon atoms.

9. The foam as set forth in claim 8 wherein plastisol foam contains vinyl chloride polymer selected from the class of a vinyl chloride homopolymer and vinyl chloride-vinyl acetate copolymer.

10. The foam as set forth in claim 9 wherein the plastisol foam contains 20–40% by weight of vinyl chloride polymer, 20–50% by weight of plasticizer.

11. The foam as set forth in claim 8 wherein R, $R'$ are methyl and $R^2$ is methyl and vinyl.

12. The foam as set forth in claim 8 wherein the ratio of the $R'_3SiO_{1/2}$ monofunctional units to the $SiO_2$ tetrafunctional units to the $R^2{}_2SiO$ difunctional units is 0.65–0.7 to 1 to 0.05–0.07.

13. The vinyl chloride polymer foam of claim 8 wherein the silicone resin is added to said vinyl chloride polymer and said plasticizer in the form of a 50% by weight solids solution in xylene.

14. A process for preparing a polyvinyl foam comprising a vinyl chloride polymer with a plasticizer and then adding to the mixture a foaming agent which is prepared comprising adding 20–80% by weight of a silicone having $R'_3SiO_{1/2}$ monofunctional units, $SiO_2$ tetrafunctional units and $R^2{}_2SiO$ difunctional units where the ratio of monofunctional to tetrafunctional to difunctional units is from 0.25–0.75 to 1 to 0.05–0.1 and where $R'$ and $R^2$ represents a radical selected from the class consisting of aralkyl, alkyl, alkenyl, alkynyl, haloalkyl, haloalkenyl, haloalkynyl, nitroalkyl, nitroalkenyl, nitroalkynyl, alkoxyalkyl and polyalkoxyalkyl, alkoxyalkenyl and polyalkoxyalkenyl, alkoxyalkynyl and polyalkoxyalkynyl, cycloalkyl, cycloalkenyl and alkyl, halogen, alkoxy and nitro-substituted cycloalkyl and cycloalkenyl, cyanoalkyl, mononuclear aryl, halogen-substituted mononuclear aryl, nitro-substituted mononuclear aryl and alkoxy-substituted mononuclear aryl such that the radicals represented by $R'$ $R^2$ have no more than 8 carbon atoms to 20–80% by weight of a plasticizer selected from the group consisting or dioctyl phthalate, diisodecyl phthalate, dihexyl phthalate, butyldecyl phthalate, diisooctyl phthalate, di(2-ethylhexyl) phthalate, n-octyldecyl phthalate, isooctylisodecyl phthalate, dioctyl azelate and dioctyl adipate such that there is 1–8% by weight of the silicone resin in the polyvinyl foam.

15. The process of claim 14 further comprising mechanically frothing the mixture of the vinyl chloride polymer, plasticizer and silicone resin to form a liquid foam, heating the liquid foam to an elevated temperature to cause the vinyl chloride polymer to form into a porous structure and cooling the foam to room temperature.

16. The process as set forth in claim 15 wherein there is present 20–40% by weight of vinyl chloride polymer, 20–50% by weight of plasticizer.

17. The process as set forth in claim 16 wherein the plasticizer is selected from the group consisting of dioctyl phthalate, diisodecyl phthalate, dihexyl phthalate, butyldecyl phthalate, diisooctyl phthalate, di(2-ethylhexyl) phthalate, n-octyldecyl phthalate, dioctyl phthalate, butylcyclohexyl phthalate, di-2-ethylhexylhexahydro phthalate, trioctyl phosphate, tricresyl phosphate, di(2-ethylhexyl) adipate, di(2-ethylhexyl) azelate, dioctyl sebacate and diisodecyl adipate.

References Cited
UNITED STATES PATENTS 3,730,931  5/1973  Simoneau et al. ____ 260—2.5 P MURRAY TILLMAN, Primary Examiner M. FOELAK, Assistant Examiner U.S. Cl. X.R.

252—356; 260—2.5 S, 31.8 S, 31.8 R, 46.5 G, 448.2 E, 827; 264—50